No. 617,322.  
J. F. DUKE.  
APPARATUS FOR MAKING FLUID EXTRACTS.  
(Application filed Dec. 14, 1897.)  
Patented Jan. 10, 1899.
(No Model.)
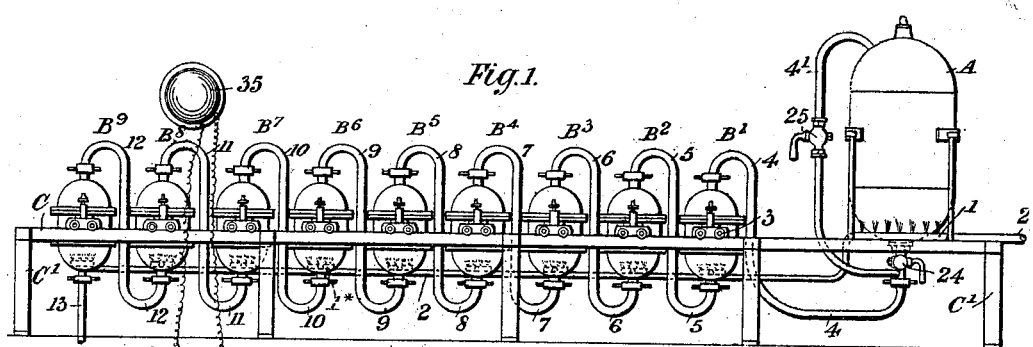
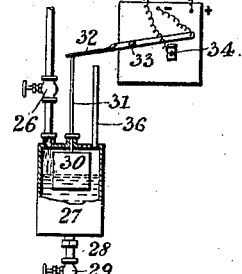
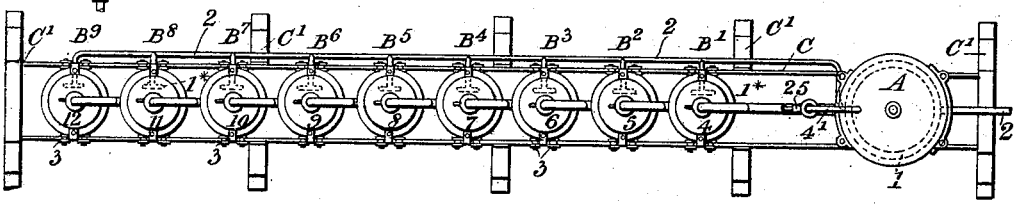
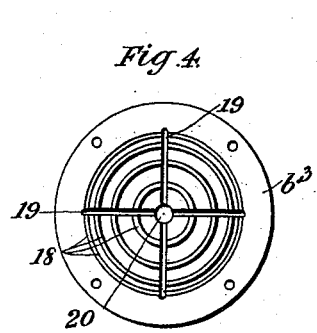
WITNESSES:  
Fred White  
Thomas F. Wallace
INVENTOR:  
John Frederick Duke,  
By his Attorneys

UNITED STATES PATENT OFFICE.

JOHN F. DUKE, OF LONDON, ENGLAND.

APPARATUS FOR MAKING FLUID EXTRACTS.

SPECIFICATION forming part of Letters Patent No. 617,322, dated January 10, 1899.

Application filed December 14, 1897. Serial No. 661,787. (No model.)

*To all whom it may concern:*

Be it known that I, JOHN FREDERICK DUKE, of London, England, have invented certain new and useful Improvements in Apparatus for the Manufacture of Liquid Extracts of Coffee or other Substances, (for which I have obtained patents in Great Britain, No. 19,675, bearing date September 5, 1896; in France, No. 267,674, bearing date June 8, 1897, and in Belgium, No. 129,697, bearing date July 27, 1897,) of which the following is a specification.

My invention has reference to the manufacture of liquid extracts of coffee or other substances; and its object is to obtain, without having recourse to the process of evaporation, an extract with all the aromatic oils or principles constituting the aroma and fragrance of the coffee or other substance (or other like qualities, according to the particular substance treated) intact and of any required strength.

The invention is more particularly applicable for the manufacture of a liquid extract of coffee, and I will hereinafter describe it as used for extracting coffee; but it is also applicable to the manufacture of other liquid extracts in which oxidation or contact with the air is prejudicial—such, for example, as scents or perfumes from flowers or the like.

For the preparation of liquid extract of coffee with my improved apparatus I preferably use coffee roasted to a cinnamon color and not to blackness and ground while still hot, and I submit the freshly-ground coffee in a series of hermetically-closed vessels to the action of boiling water caused to pass under pressure from vessel to vessel throughout the series, the said vessels being connected together and those at the two ends of the series being connected, respectively, with a boiler or hot-water and steam supply and with a closed liquid-extract receiver. It is essential that the vessels be hermetically closed, so that the air is prevented from coming in contact with the coffee when this is at a high temperature, and thereby oxidizing the aromatic oils or principles.

From time to time—say, about every ten to fifteen minutes, more or less—the vessel next the boiler is removed, the remaining vessels shifted one stage nearer the boiler, and a fresh vessel charged with ground coffee put in position next the extract-receiver. Only as much water is supplied as is required in the final extract, so that it is not necessary to have recourse to evaporation, according to the usual practice in making liquid extract of coffee, and as all the vessels and the receiver are closed the water that flows through the vessels and extracts the essential elements from the coffee therein is not exposed to the oxidizing influence of the air, and it therefore reaches the receiver in the form of an extract without loss of any of the aroma and fragrance of the coffee. It will be understood that the water in passing through the series of vessels flows first through that in which the coffee has become nearly spent by the water previously passed through it and then through those less spent until it reaches the vessel containing a fresh charge of coffee. The flow of water is intermittent, only enough being supplied at a time to approximately fill one vessel which has been about two-thirds filled with ground coffee.

In carrying out my invention I provide a plurality of separately-movable vessels with an inlet at top and an outlet at bottom and with pipes and appliances for connecting up in an air-tight manner the bottom of one vessel with the top of the next of the series or the top of the first vessel with the boiler and the bottom of the last vessel with the extract-receiver, or, preferably, with a cooling-worm placed between the last vessel and the receiver. The vessels have percolators or strainers at bottom to prevent the coffee-grounds choking the outlet. The pipe that connects the first vessel with the boiler preferably has two branches communicating, respectively, with the water and steam spaces of the boiler. The vessels are preferably supported on one or more horizontal rails and are fitted with rollers or other antifriction appliances to facilitate their movement along the same during the required changes of position.

In the accompanying drawings, Figure 1 is a side elevation, with the vessel 27 partly in section, illustrating the general arrangement of apparatus constructed according to this invention comprising, by way of example, a series of nine extracting vessels. Fig. 2 is a plan of the same. Fig. 3 is a central vertical section of one of the extracting vessels, and Fig. 4 is a plan of the lower part of the same with the strainer omitted. Figs. 3 and 4 are drawn to a larger scale than Figs. 1 and 2.

In the figures, A is a boiler adapted to be heated by means of a ring 1 of gas-jets fed by a gas-supply pipe 2.

$B'$ $B^2$ $B^3$ $B^4$ $B^5$ $B^6$ $B^7$ $B^8$ $B^9$ are a series of nine extracting vessels arranged one behind the other and each adapted to run by means of grooved wheels 3 upon a pair of horizontal rails C C, which are carried on pillars C' and also serve to support the boiler A. A pipe 4 connects the bottom or water-space of the boiler A with the top of the first extracting vessel $B'$, and a pipe 5 connects the bottom of the vessel $B'$ with the top of the next following vessel $B^2$ of the series, and so on until the last vessel $B^9$ is reached, the other successive vessels being connected by the pipes 6 7 8 9 10 11 12. The bottom of the last vessel $B^9$ is fitted with a delivery-pipe 13, provided with a cock, as hereinafter described.

Each extracting vessel consists of a top part $b'$, a middle part $b^2$, and a bottom part $b^3$. The top part $b'$ is adapted to be closed air-tight upon the middle part $b^2$ by means of thumb-screws 14 and clamps 15, hinged to the middle part $b^2$. The middle part and the bottom part are connected in an air-tight manner by flanges and bolts, as shown, with or without a suitable packing. The middle part is provided with brackets and journals 16, which carry the grooved wheels 3, (two on each side of the vessel,) that run on the rails C. The bottom part $b^3$ is provided with a hemispherical percolator or strainer 17, of wire-gauze, which retains the coffee-grounds and prevents them from choking the outlet. The strainer 17 is flanged at top, and the flange is held between the flanges of the parts $b^2$ $b^3$. Ribs or projections 18 are formed on the inner surface of the bottom part $b^3$, against which the strainer 17 takes a bearing and by which it is supported in such a manner as to leave a space between it and the inner surface of the vessel for the collection of the liquor or extract passing through the strainer. Channels 19 are formed down the sides of the bottom part $b^3$ and through the ribs 18 in order to facilitate the passage of the liquor to the outlet 20. To this bottom outlet 20 is fitted by means of a screw-union 21 the lower end of one of the pipes 5 to 12, as the case may be, according to the order of position of the vessel in the series—viz., the pipe 9 in the case of the vessel $B^5$, for example. The top part $b'$ of the vessel has an inlet 22, to which is fitted by means of a screw-union 23 the upper end of the preceding pipe in order of position—viz., the pipe 8 in the case of the vessel $B^5$.

The pipe 4, which connects the water-space of the boiler A with the top of the first vessel $B'$, has a branch 4', which connects with the steam-space of the boiler A. Cocks 24 and 25 are provided, so as to allow of establishing communication as may be required between the first vessel $B'$ and either the steam or the water space of the boiler A. The liquid in all the extracting vessels $B'$ to $B^9$ should be kept at boiling-point. This may be effected by any suitable heating apparatus—such, for example, as a set of gas-jets 1* under each vessel.

The apparatus is worked as follows: Supposing that all the vessels $B'$ to $B^9$ have been charged with ground coffee and the process has already been carried on until the ground coffee in all the vessels $B'$ to $B^8$, except the last, $B^9$, (which has just been put in place,) has become partly spent in progressive degrees. All the vessels $B'$ to $B^8$, except the last, $B^9$, are full of water, more or less in the form of coffee extract. Hot water is admitted from the boiler A, through the cock 24 and pipe 4, to the first or most-spent vessel $B'$, the amount being sufficient to fill up the vessel $B^9$, freshly charged with coffee, the result of which is that the liquid flows from vessel to vessel until the last or new one, $B^9$, becomes filled. The hot-water supply is then shut off at the cock 24 and steam is turned through the cock 25 and pipes 4' 4 on to the first vessel $B'$. The steam gradually forces the water or liquid out of the first vessel $B'$, so that it is again caused to flow from vessel to vessel, and the last vessel $B^9$ delivers through the pipe 13 an amount of liquid in the form of extract equal to that last supplied to the first vessel $B'$. The first vessel $B'$ is now disconnected from the boiler A and the last vessel $B^9$ from the worm. The first vessel $B'$ is then removed, all the others pushed one stage nearer the boiler, a fresh vessel placed next the worm, and the connections are remade. The apparatus is then ready for the admission of a fresh supply of water to the series of vessels, as before.

In order to insure that a given amount of extract shall be delivered from the last vessel $B^9$ through the delivery-pipe 13 at every action of the apparatus, and therefore insure at the same time the introduction of an equivalent amount of water into the first vessel $B'$, whereby an extract of practically uniform strength is always obtained, I adopt the arrangement which I will now describe. The delivery-pipe 13 from the last vessel $B^9$ is fitted with a cock 26 and leads to an intermediate vessel 27. From the vessel 27 a pipe 28, fitted with a cock 29, leads to a closed extract-receiver, (not shown,) a cooling-worm being interposed, if desired, between the vessel 27 and the said extract-receiver. In the vessel 27 is a float 30 on the end of a rod 31, which passes through an aperture in the top of the vessel. On the top of a rod 31 rests one end of a lever 32, pivoted at 33. When this end of the lever 32 is raised a given distance, its other end comes against a contact 34 and completes the circuit of an electric bell 35. The parts are so adjusted that when the vessel 27 has received the given amount of extract through the pipe 13 the bell-circuit is completed and the bell begins to ring. The attendant at once closes the cock 26 and opens the cock 29, and the extract in the vessel 27 then flows through the pipe 28 into the closed extract-receiver. 36 is an air-pipe to the vessel 27.

The extract can be drawn from the closed receiver into bottles ready for sale.

Instead of the boiler A a hot-water tank may be employed, disposed at such a height relatively to the extracting vessels as to provide the necessary pressure to force the water from vessel to vessel.

The strength of the extract obtained can be varied by varying the quantity of water supplied at each charge or proportionately varying the number of vessels.

What I claim, and desire to secure by Letters Patent, is—

1. In apparatus for the manufacture of liquid extract of coffee or other substances, a water-supply apparatus, and a receiving vessel, in combination with a series of separately-movable extracting vessels, pipes separably connecting the extracting vessels together in succession, a pipe separably connecting one of the extracting vessels near one end of the series to the water-supply apparatus, and a pipe separably connecting another of the extracting vessels near the other end of the series to the receiving vessel, whereby successive extracting vessels can be disconnected from the receiving vessel, moved to the other end of the series and connected to the initial vessel thereof and to the water-supply, substantially as and for the purpose set forth.

2. In apparatus for the manufacture of extracts and for similar purposes, the combination with supply and discharge apparatus, of a series of separately-removable vessels, pipes separably connecting such vessels together in succession, pipes separately connecting the first vessel of the series with the supply apparatus and the last vessel of the series with the discharge apparatus, a support movably carrying said vessels, and means whereby the last vessel of the series can be disconnected, the adjacent vessel can be connected to the discharge apparatus, and the disconnected vessel can be connected to the first vessel of the series and to the supply apparatus.

3. In apparatus for the manufacture of extracts and for like purposes, the combination with supply and discharge apparatus, of a series of vessels connected together in succession, a separable connection between the first vessel of such series and the supply apparatus, a separable connection between the last vessel of such series and the discharge apparatus, a series of heaters for such vessels, and means whereby the last vessel of the series can be removed and connected with the series as the first, and means whereby the series of vessels can be moved to successive positions relatively to such heaters and to the supply and discharge apparatus.

4. In apparatus for the manufacture of liquid extract of coffee or other substance, a hot-water-supply apparatus, a series of independently-movable hermetically-closed extracting vessels, a pipe connecting the hot-water-supply apparatus with the top of the first extracting vessel, pipes connecting the bottom of each extracting vessel with the top of the next extracting vessel, a delivery-pipe connecting with the bottom of the last extracting vessel and means whereby the pipe connections can be temporarily disconnected and then reconnected, substantially as and for the purpose set forth and shown.

5. In a vessel for making liquid extract of coffee or other substance, an approximately hemispherical lower part hermetically connected to the upper part of said vessel ribs on the inside of said lower part, a hemispherical percolator in said lower part bearing against said ribs and channels in said lower part and in said ribs, substantially as and for the purpose set forth and shown.

6. In apparatus for the manufacture of liquid extract of coffee or other substance, the combination with a series of movable extracting vessels, an apparatus supplying said vessels with hot water and pipes connecting said vessels with each other and with said supply apparatus, of journals at the sides of said vessels, wheels mounted on said journals and rails supporting said wheels, substantially as and for the purpose set forth.

In witness whereof I have hereunto signed my name in the presence of two subscribing witnesses.

JOHN F. DUKE.

Witnesses:
GEORGE C. BACON,
ROBERT M. SPEARPOINT.